United States Patent [19]

Ra et al.

[11] Patent Number: 5,062,823
[45] Date of Patent: Nov. 5, 1991

[54] CONTINUOUSLY VARIABLE TRANSMISSION WITH CONTROLLING BRAKES

[76] Inventors: Jong Oh Ra, 2H-1, 265-154, Bokwang Dong, Yongsan-ku, Seoul; Joon Young Lim, Duckyong Villa KA-204, 141-2, Duckjeong-Ri, Hoecheon-Eup, Yangiu-Kun, Kyungki-do, both of Rep. of Korea

[21] Appl. No.: 551,772

[22] Filed: Jul. 9, 1990

[30] Foreign Application Priority Data

Aug. 26, 1989 [KR] Rep. of Korea ............. 89-12212

[51] Int. Cl.$^5$ .............................................. F16H 37/06
[52] U.S. Cl. ................................. 475/330; 475/150; 475/317
[58] Field of Search .................... 475/1, 2, 150, 317, 475/330

[56] References Cited

U.S. PATENT DOCUMENTS

| | | | |
|---|---|---|---|
| 2,761,332 | 9/1956 | Gray | 475/1 X |
| 2,973,622 | 3/1961 | Bognar | 475/1 X |
| 3,150,544 | 9/1964 | Brass | 475/330 X |
| 3,218,887 | 11/1965 | Flynn | 475/1 X |
| 3,301,093 | 1/1967 | Ewert | 475/1 X |
| 3,429,200 | 2/1969 | Green | 475/330 |
| 4,191,070 | 3/1980 | McKinniss | 475/317 X |
| 4,304,152 | 12/1981 | Michling | 475/330 |
| 4,334,440 | 6/1982 | Fonck | 475/317 X |
| 4,598,610 | 7/1986 | Kim | 475/330 |
| 4,779,486 | 10/1988 | Schumacher | 475/1 X |

FOREIGN PATENT DOCUMENTS

| | | | |
|---|---|---|---|
| 0587967 | 4/1925 | France | 475/1 |
| 0368356 | 5/1963 | Switzerland | 475/330 |
| 0833515 | 4/1960 | United Kingdom | 475/2 |

Primary Examiner—Leslie A. Braun
Assistant Examiner—Daniel Wittels
Attorney, Agent, or Firm—Limbach, Limbach & Sutton

[57] ABSTRACT

A variable transmission includes an input shaft with an input sun gear mounted thereon and a differential gear carrier rotatably mounted thereon to enable independent rotation about input shaft. A transmission shaft is coaxially mounted on input shaft. A differential gear carrier is rotatably mounted on the transmission shaft. A plurality of pins interlink carriers to enable simultaneous rotation. A first differential gear is rotatably mounted on each pin, and each gear is meshed with an input sun gear. A control ring gear is rotatably mounted on the transmission shaft with the controlling gear meshed with each differential gear. A plurality of rods rotatably secures each carrier to enable rotation about its axis and to enable simultaneous rotation of the carriers. An output shaft terminating in an output ring gear is rotatably mounted relative to the input shaft. A second differential gear is rotatably mounted on each rod and is meshed with the gear differential and output ring gear. A planetary gear is mounted on each rod and each planetary gear is meshed with the sun gear of the transmission shaft. A first brake mechanism applies rotational resistance to the control ring gear such that when the control ring gear is frictionally engaged, the rotation of the control ring gear decreases. Thus, torque is applied to the output ring gear to initiate and maintain rotation of output ring gear and, upon further frictional engagement which stops rotation of the control ring, the rotational speed of the output ring gear further increases.

16 Claims, 13 Drawing Sheets

5,062,823

CONTINUOUSLY VARIABLE TRANSMISSION WITH CONTROLLING BRAKES

BACKGROUND OF THE INVENTION

FIELD OF INVENTION

The present invention relates to a continuously variable transmission, and more particularly to a transmission which can convert and transmit the power of an engine to comply with the load on the output shaft without changing gears with a shift lever.

In general, a transmission device converts and transmits the power generated by an engine to comply with the load placed on the output shaft. Prior art transmission devices utilize a hand-operated shift lever and a foot-operated clutch to cut the power between the input side receiving the power from the engine and the transmission device in order to accomplish a shifting of the gears. Automatic transmissions are those which do not need a foot clutch.

A continuously automatic transmission device which makes it possible to convert and to transmit power without a clutch by using a combination of differential gears consisting of ring gears, planetary gears and sun gears, is described in U.S. Patent Application Ser. No. 347,916 now U.S. Pat. No. 4,966,575 filed May 5, 1989. Further, another continuous transmission uses a combination of bevel gears and worm gears and is fully described in a U.S. Pat. No. 3,770,879 by Thomas A. W. K. Watson.

However, such transmission devices fail to provide smooth transmission steps and are mechanically complicated. Hence, there is a need for the development of a transmission device which provides excellent capability and which has a relatively simple mechanical structure.

The object of the present invention is to provide a mechanically efficient and continuously variable transmission which is capable of converting and transmitting power to the output shaft in a smooth and stepless while being mechanically simple in design.

A further object of the present invention is to provide a transmission device which rotationally dissipates the rotational driving force transmitted to the input shaft.

A further object of the present invention is to provide a transmission device having a first brake means for gradually applying rotational resistance to a control ring gear to initiate and maintain the rotation of an output shaft and upon further activation of the first brake means to stop the control ring gear such that the rotational speed of the output shaft is further increased.

A further object of the present invention is to provide a transmission device having a second brake means for gradually applying rotational resistance to a high speed control ring gear resulting in an increase in the rotational speed of the output ring gear and upon further activation of the second brake means to stop the rotation of the high speed control ring gear, the rotational speed of the output shaft exceeds the rotational input of input shaft.

To achieve these and other objects, the present invention comprises a combination of planetary gears, sun gears, and ring gears driven by an input shaft to vary the rotational output of the output shaft. A first and a second brake means controls the rotational speed of respective ring gears to initiate and maintain rotational movement of the output shaft and to increase rotational movement of the output shaft, respectively. Upon fully engaging the second brake means and fully disengaging the first brake means, the output shaft can rotate at a greater speed than the input shaft.

SUMMARY OF THE INVENTION

The variable transmission of the present invention is defined by the appended claims with a specific embodiment shown in the attached drawings. For the purpose of summarizing the invention, the invention relates to a variable transmission which comprises a speed change section having an input shaft with a first section, a mid-section and a second section for receiving rotational input from a gasoline, electric engine or the like. An input sun gear is mounted between the mid-section and the second section of the input shaft to enable simultaneous rotation with the input shaft. A differential gear carrier is rotatably mounted to enable independent rotation about the second section of the input shaft. A transmission shaft has a first end and a second end and is rotatably and coaxially mounted at the mid-section of the input shaft to enable independent rotation about the input shaft. The first end of the transmission shaft terminates in a sun gear. A differential gear carrier is mounted on the transmission shaft to enable independent rotation about the transmission shaft. A plurality of pins is utilized with each pin secured to and interlinking differential gear carrier and differential gear carrier to enable simultaneous rotation of the carriers and relative to the input shaft. A plurality of first differential gears is utilized with each gear rotatably mounted on a pin, respectively, of the plurality of pins. Each gear of the plurality of first differential gears meshes, i.e. is in mechanical communication, with the input sun gear. A control ring gear is rotatably mounted on the transmission shaft. The control ring gear is in mechanical communication with each gear of the plurality of first differential gears. A plurality of rods is utilized with each rod interlinking and rotatably secured to each differential gear carrier and differential gear carrier to enable each rod to rotate about its axis and to enable simultaneous rotation of the carriers and relative to the input shaft. An output shaft terminates in an output ring gear with the output shaft and the output ring gear being mounted to enable independent rotation of the output ring gear and output shaft about the second differential gears is utilized with each gear rotatably mounted on a rod of the plurality of rods and with each gear being in simultaneous mechanical communication with a gear of the plurality of first differential gears and with the output ring gear. A plurality of planetary gears is utilized with each planetary gear mounted on each rod of the plurality of rods. Each rod also includes a gear of the plurality of second differential gears and with each planetary gear of the plurality of planetary gears being in mechanical communication with the sun gear. A first brake means applies rotational resistance to the control ring gear such that in use when the first brake means frictionally engages the control ring gear, the rotation of the control ring gear decreases whereby torque is applied to the output shaft to rotationally initiate the output shaft. Upon further activation of the first brake means, the rotation of the control ring gear stops and the rotational speed of the output shaft further increases.

The transmission preferably includes an idler gear, which includes a hub, mounted on the second section of the input shaft to enable independent rotation thereof rotative to the input shaft. The differential gear carrier is mounted on the hub of the idler gear to enable independent rotation relative to the hub of the idler gear. The output shaft which terminates in the output ring gear is distally mounted on the hub relative to the differential gear carrier to enable independent rotation of the output ring gear and output shaft relative to the hub. This provides a more structurally stable device since the idler gear provides support to gears which aids in maintaining the alignment of the components within the device.

The variable transmission according to the present invention may further include an overdrive section wherein the second end of the transmission shaft terminates in a sun gear. A circular plate carrier is rotatably mounted on the second end of the transmission shaft. Another circular plate carrier is rotatably mounted on the first section of the input shaft. A plurality of locking pins is employed with each locking pin secured to and interlinking circular plate carrier and circular plate carrier to enable simultaneous rotation of carriers relative to the input shaft. A plurality of second planetary gears is utilized with each planetary gear rotatably mounted on each locking pin of the plurality of locking pins. The sun gear is in mechanical communication with each gear of the plurality of second planetary gears. A high speed control ring gear is rotatably mounted on the transmission shaft with the ring gear being in mechanical communication with each gear of the plurality of second planetary gears. An input sun gear is mounted between the first section and the mid-section of the input shaft to enable simultaneous rotation with the input shaft. A plurality of first planetary gears is employed, and each first planetary gear is rotatably mounted on a locking pin of the plurality of locking pins. Each gear of the plurality of first planetary gears is in mechanical communication with the input sun gear. A ring gear is secured against rotation relative to the input shaft and is in mechanical communication with each gear of the plurality of first planetary gears. A second brake means applies rotational resistance to the high speed control ring gear such that in use when the frictional resistance being applied to the control ring gear is removed and when the second brake means frictionally engages the high speed control ring gear, the rotational speed of the high speed control ring gear decreases resulting in an increase of the rotational speed of the output shaft. Upon further activation of the second brake means, the rotation of the high speed control ring stops resulting in the rotational speed of the output shaft exceeding the rotational input of input shaft.

Preferably, the brake means utilize mechanical frictional force to control the rotational speed of the control ring gear and the high speed control ring gear, respectively. The brake means, may also utilize electromagnetic force to control the rotational speed of the control ring gear and the high speed of the control ring gear and the high speed control ring gear, respectively.

When considering the diameter of the input sun gear and the sun gear, preferably the diameter of the input sun gear is greater than the diameter of the sun gear. When considering the diameter of gear of the plurality of first planetary gears and the diameter of gear of the plurality of second planetary gears, preferably the diameter of each gear of the plurality of first planetary gears is smaller than the diameter of each gear of the plurality of second planetary gears.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For fuller understanding of the nature and objects of the invention, reference should be made to the following detailed description taken in conjunction with the accompanying drawings in which.

Similar reference characters refer to similar parts throughout the several views of the drawings.

DETAILED DESCRIPTION OF THE INVENTION

Figure 1:
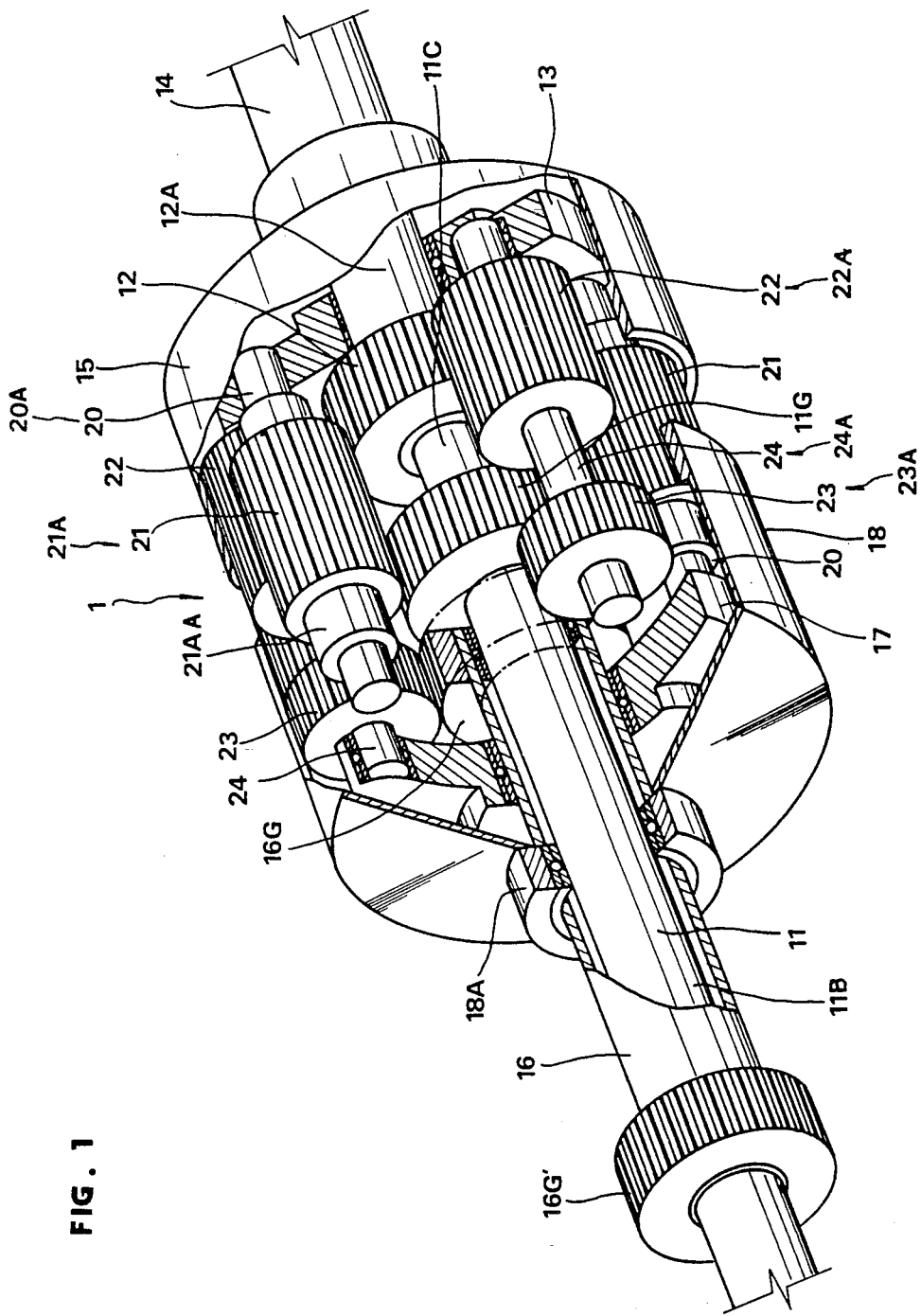
FIG. 1 is a perspective view of the speed change section of the present invention.
Figure 11:
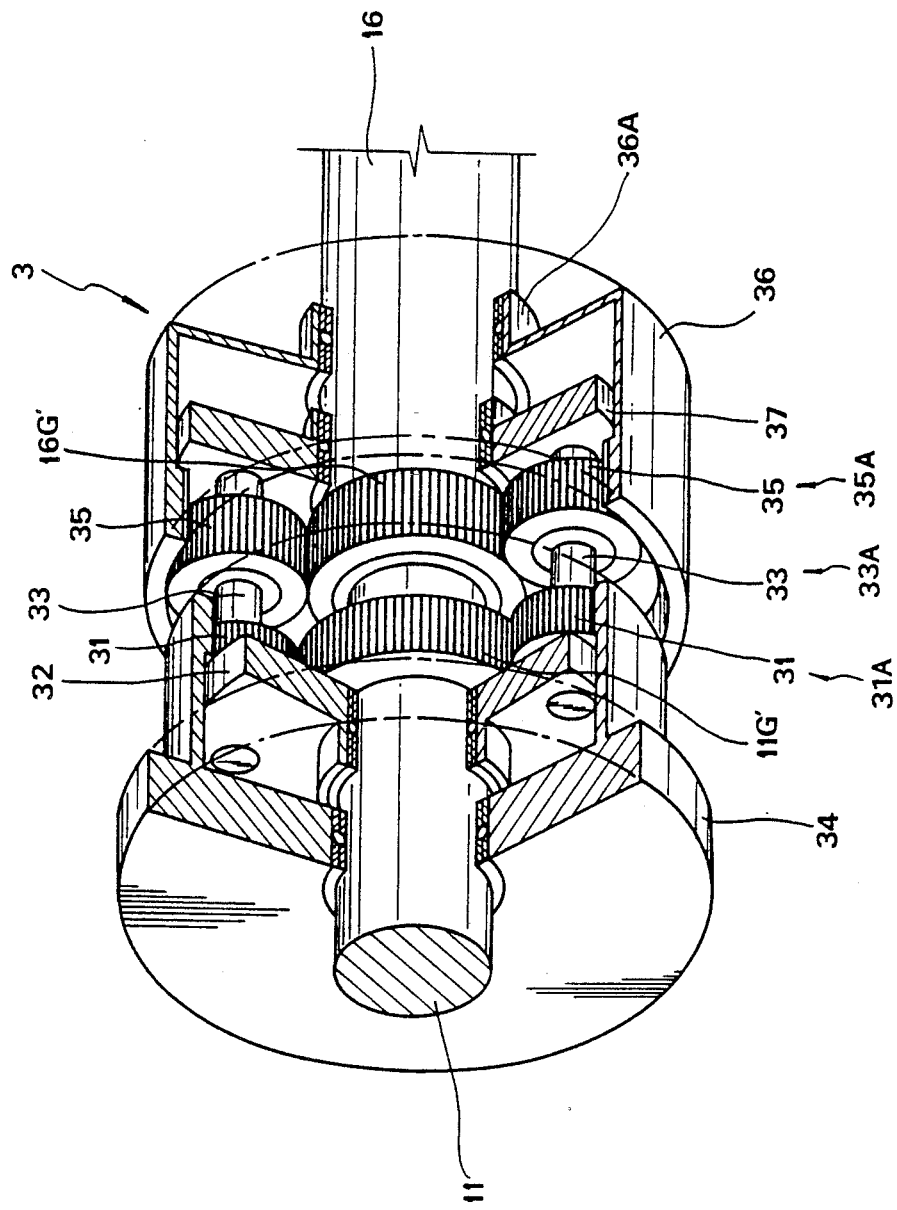
FIG. 11 is a perspective view of the overdrive section of the FIG. 10 with some parts cut away.

The continuously variable transmission in accordance with the present invention is composed of a speed change section 1, FIG. 1, which prevents the power of the engine from rotating the output shaft, i.e. provides a neutral state, or converts the input power into a low speed or medium speed and transmits it to the output shaft 14. Thus the speed change section of the variable transmission provides a neutral state, initiates rotational speed of the output shaft and increases the rotational speed of the output shaft into a low or medium range. The overdrive section 3, FIG. 11, which consists of two sets of planetary gears, converts the input power into a high speed state, i.e. further increases the rotational speed of the output shaft.

Figure 10:
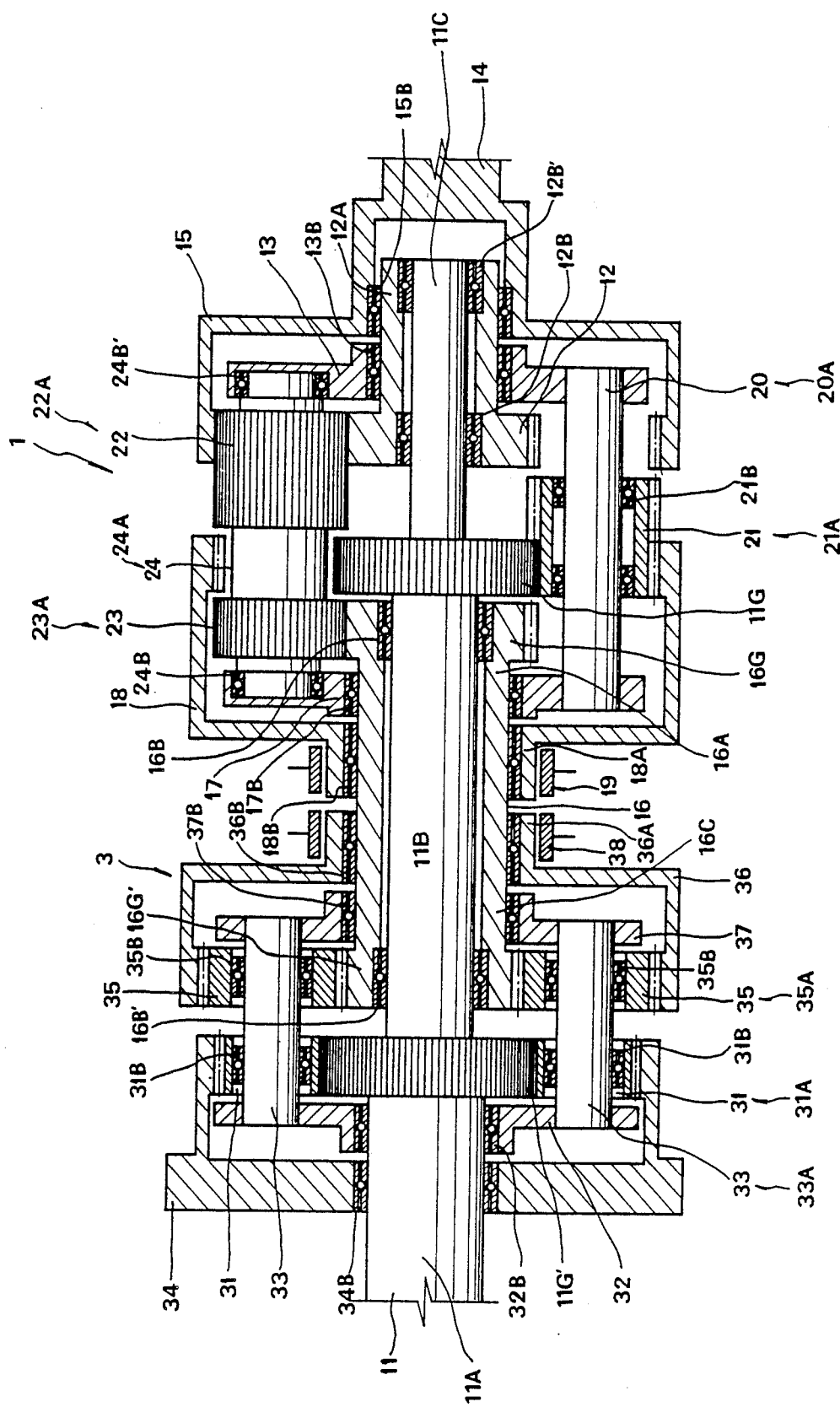
FIG. 10 sectional view of the overdrive section and the speed change section of the FIG. 1 as assembled and connected together.

In the speed change section 1, the input shaft 11, with a first section 11A, a mid-section 11B and a second section 11C receives the rotational driving force from an engine, or the like. The input sun gear 11G is positioned between the mid-section 11B and the second section 11C of the input shaft 11 and mounted thereat so as to rotate simultaneously with the input shaft 11. The idler gear 12 having a hub 12A is positioned at the second section 11C of the input shaft 11 so as to rotate independently of the input shaft 11 by means such as bearings 12B, 12B'. The hub 12A of the idler gear 12 receives the circular plate carrier or differential gear carrier 13 so as to rotate freely thereon by means such as bearing 13B. An output ring gear 15, integrally formed with the output shaft 14 for transmitting the power, is positioned on hub 12A next to the carrier 13 so as to rotate freely by means, such as bearing 15B. A transmission shaft 16 having a first end 16A and a second end 16C is coaxially mounted on the mid-section 11B of the input shaft 11 so as to enable independent rotation about the input shaft by means such as bearings 16B, 16B' (FIG. 10). The first end 16A of transmission shaft 16 terminates in a sun gear 16G and the second end 16C of the transmission shaft 16 terminates in a sun gear 16G'. The sun gear 16G and sun gear 16G' may be formed with inner splines therein. The circular plate carrier or differential gear carrier 17 is mounted proximate the sun gear 16G and the control ring gear 18 is mounted proximate carrier 17 at the first end 16A of the transmission shaft 16 so as to rotate freely by means such as bearings 17B, 18B. The first brake means 19 is operatively positioned proximate the control ring gear 18 to enable frictional engagement therewith. Thus, the first brake means 19 functions by frictionally engaging the tube shaft boss 18A positioned on the control ring gear 18.

Each pin 20, of the plurality of pins 20A, secures and interlinks differential gear carrier 13 to differential gear carrier 17 to enable simultaneous rotation of the carriers 13 and 17 relative to the input shaft. The attachment of each pin 20 to the carriers 13 and 17 is such that the pin does not rotate about its axis, as see FIG. 13. Each gear 21, of the plurality of first differential gears 21A, is mounted on a pin 20, of the plurality of pins 20A, so as to rotate freely thereon by means such as bearing 21B. When the carriers 13 and 17 are operatively positioned in the device, each gear 21 is in mechanical communication with the input sun gear 11G, the control ring gear 18 and a second differential gear 22. That is, the inner side of the forward half of each first differential gear 21 meshes, i.e. in mechanical communication, with the input sun gear 11G fixed to the input shaft 11, the outer side of the forward half of each first differential gear meshes with the control ring gear 18 in speed change section, and the rear half of each first differential gear 21 meshes with each second differential gear 22 which will be described hereinafter.

Figure 2:
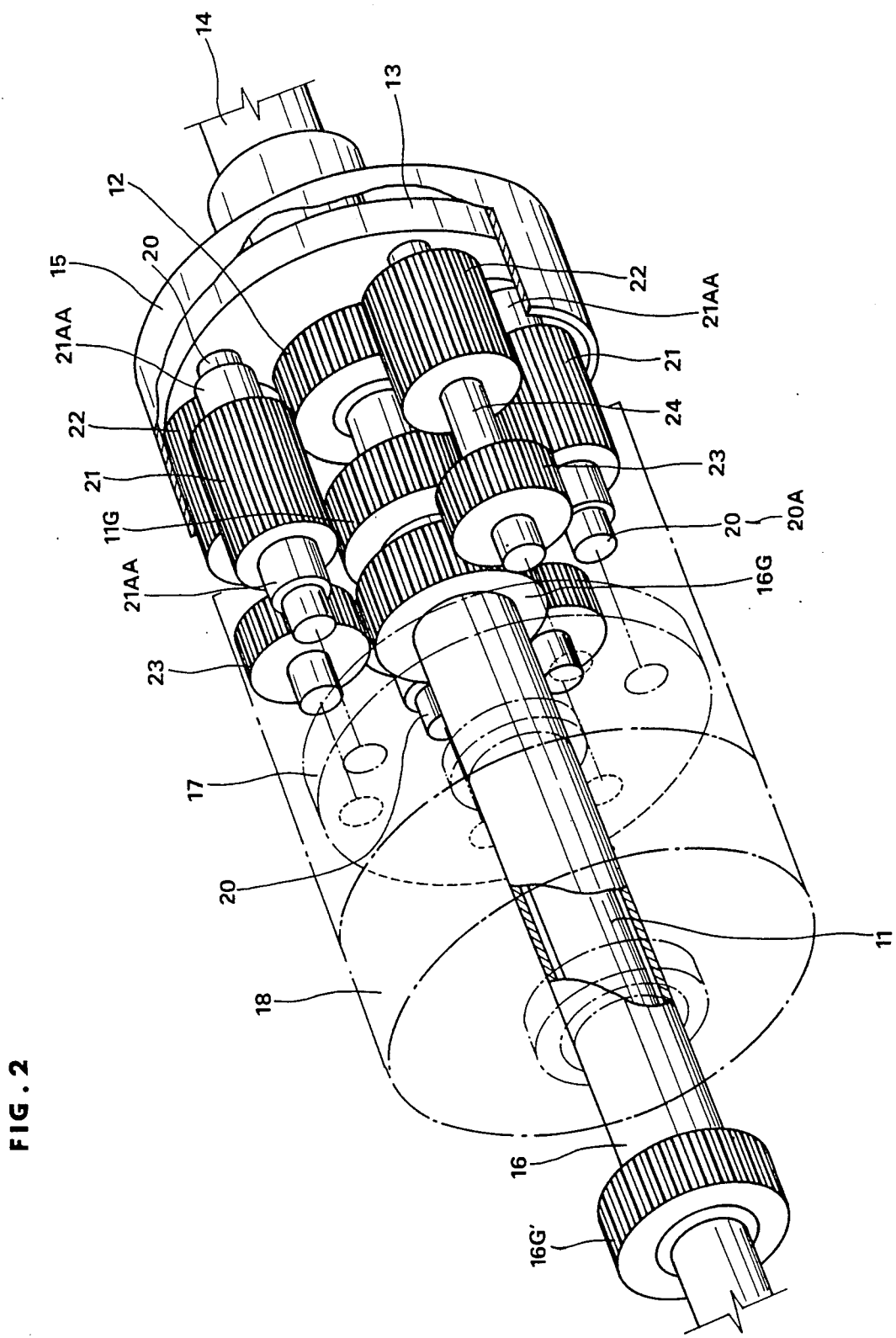
FIG. 2 is an exploded perspective view of the speed change section shown in FIG. 1.

FIG. 2 illustrates the use of retaining rings 21A coaxially mounted on pin 20 on each side each gear 21 to prevent axial movement of the gear 21. Gear 21 can be secured to pin 20 other means. That is, the gear 21 can be integrally formed with the pin 20 and a bearing can be inserted at each end of the pin 20 so that the pin 20 can rotate about its axis.

Figure 3:
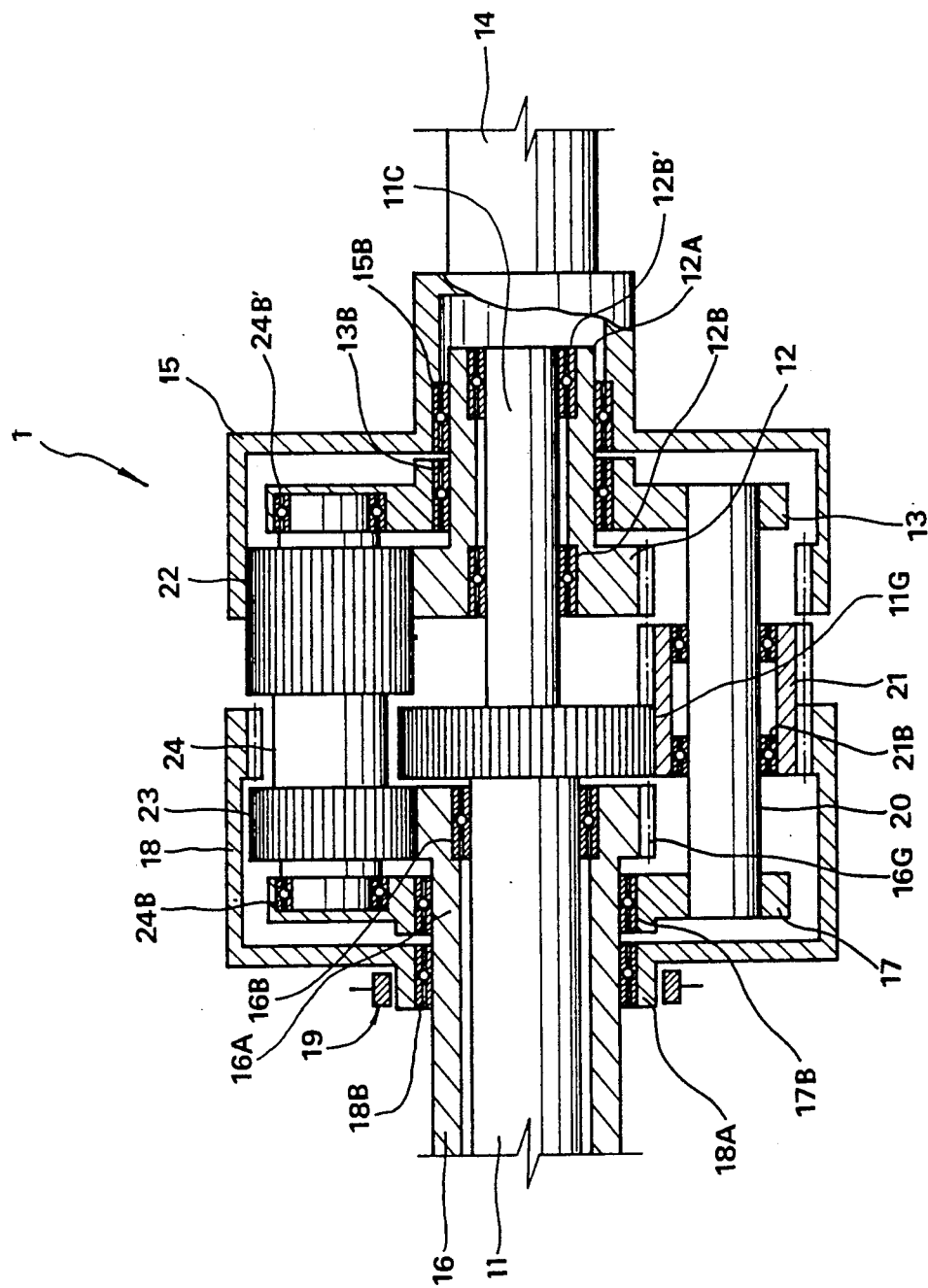
FIG. 3 is a sectional view of the speed change section as assembled thereof.

FIGS. 2 and 3 illustrate the proximate portion of gear 22, i.e. that portion of gear 22 of the plurality of second differential gears 22A closest to the left side of the page illustrating FIG. 2, meshed with the distal portion of gear 21, i.e. that portion of gear 21 of the plurality of first differential gears 21A furthest from the left side of the page of FIG. 2. This point of reference, i.e. proximal-distal, is defined in this application as discussed above where used regarding other structures in this application. Thus, the distal portion of the second differential gear 22 is meshed with idler gear 12, and also with the output ring gear 15. The plurality of planetary gears 23A in speed change section are meshed with the sun gear 16G in speed change section and rotate simultaneously with the plurality of second differential gears 22A. The planetary gear 23 and the second differential gears 22 are mounted on rod 24 of the plurality of rods 24A and each end of rod 24 is rotatably mounted in each carrier 17, 13 in order to permit the rotation of each rod 24 about its axis by such means as bearings 24B, 24B' and to permit the rotation of carriers 13 and 17 about the input shaft 11. FIG. 3 also illustrates the output shaft 14 which terminates in an output ring gear 15. The output ring gear 15 is distally mounted on the hub relative to the differential gear carrier 13 to enable independent rotation of the output ring gear and output shaft relative to the hub.

Figure 13:
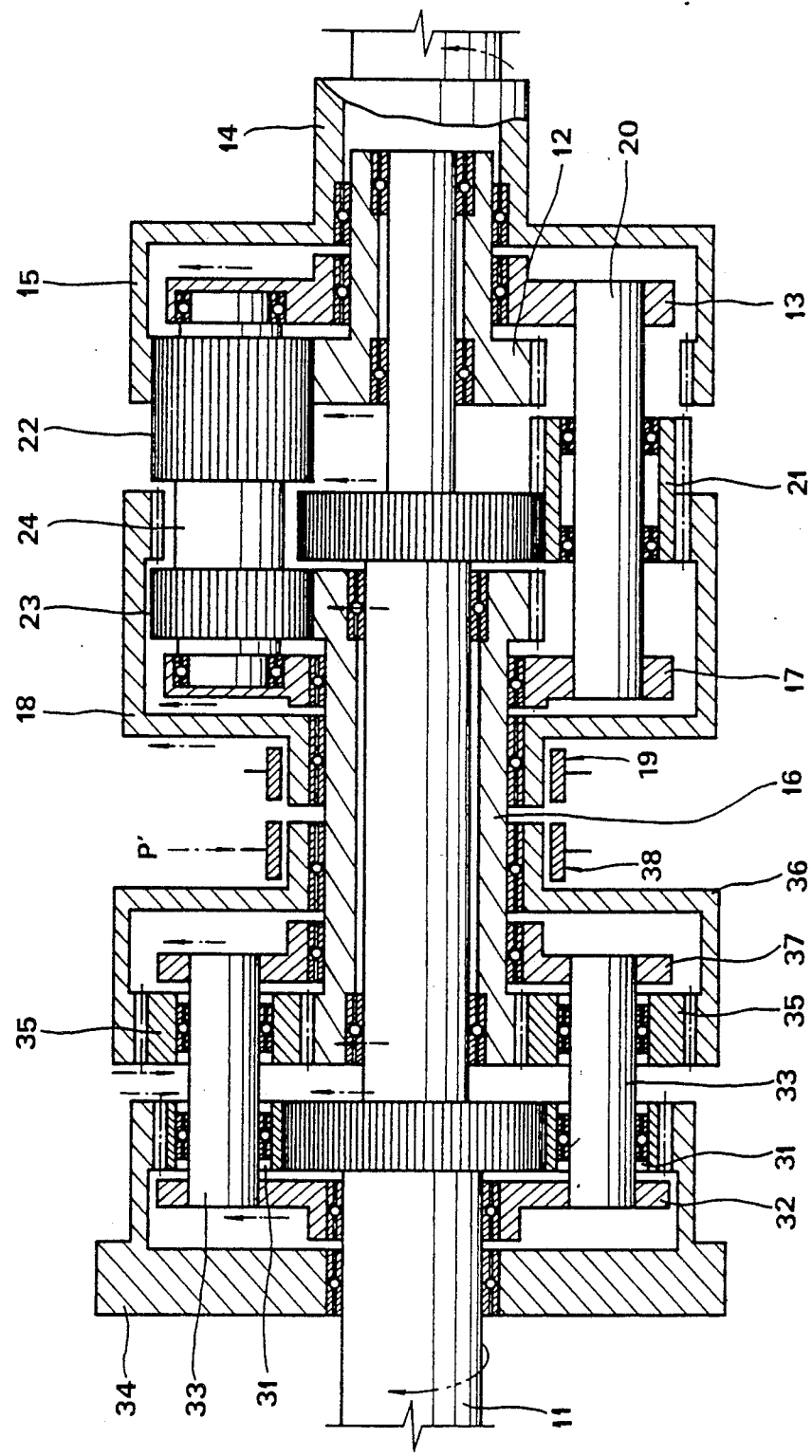
FIG. 13 is a sectional view of the transmission of the present invention in the high speed state.

In the overdrive section 3 an input sun gear 11G', which may be formed with an inner spline, is mounted between the first section 11A and the mid-section 11B of the input shaft to enable simultaneous rotation with the input shaft. Each first planetary gear 31, of the plurality of first planetary gears 31A, is meshed with the input sun gear 11G' and is mounted on a locking pin 33 to enable rotation about the pin 33 by means such as bearings 31B. The ends of each pin 33, of the plurality of locking pins 33A, is fixed to and interlinks circular plate carriers 32 and 37, respectively, to enable simultaneous rotation of carriers 32 and 37 relative to input shaft, as illustrated at FIG. 13. Circular plate carrier 32 is rotatably mounted on the first section 11A of the input shaft 11 by means such as bearing 32B. Circular plate carrier 37 is rotatably mounted on the second end 16C of the transmission shaft 16 by means such as bearing 37B.

Each gear 35 of the plurality of second planetary gears 35A is meshed with the sun gear 16G' and the high speed control ring gear 36 and is rotatably mounted on a locking pin 33 by means such as bearing 35B. The high speed control ring gear 36 is rotatably mounted on the transmission shaft 16 by means such as bearing 36B and meshes with each second planetary gear 35 of the plurality of second planetary gears 35A.

Ring gear 34 which is secured against rotation relative to the input shaft 11 with the ring gear 34 in mechanical communication with each gear 31 of the plurality of first planetary gears 31A. The fixed ring gear 34 is mounted on the input shaft 11 to enable the rotation of the input shaft while maintaining its stationary state by such means as bearing 34B.

The second brake means 38 functions by frictionally engaging the tube shaft boss 36A positioned on the high speed control ring gear 36.

It is to be noted that the first 19 and the second 38 brake means may automatically or manually controlled by utilizing means such as electronic, electric, hydraulic and pneumatic means. The brake means described herein is provided with a brake lining so that the control ring gear 18 in speed change section and the high speed control ring gear 36 in overdrive section are braked by the operation of the lining frictionally engaging the ring gears. Other means to control the rotational speed of the ring gears 18 and 36 are known to those skilled in the art. Hence, the present invention is not limited to the embodiment described herein. Further, the bearings or splines can be substituted by other elements which have same function.

The continuously variable transmission of the present invention may be used with any rotational power means and in any mechanism which requires that the power output be varied to accommodate varying loads. Thus, the present invention may be used in combination with automobiles and industrial machines, etc. For purposes of illustration, the continuously variable transmission of the present invention is described in combination with an automobile.

In the automobile the rotational force is transmitted from the driving shaft of the engine to the input shaft 11 of the present invention. Here the input speed is converted to low, medium, medium-high or high speed and transmitted to the output shaft 14.

A description of the operation of the present invention is set forth below. Since the transmission of the present invention constantly changes in response to the input and load, the following may be an inexact explanation of the "stop-action" stages occurring at any one moment in time in the operation of the present device. Thus, the inventor accedes that there may be other explanations.

1. Neutral state (FIG. 4 and 5)

Input shaft 11—Input sun gear 11G—First

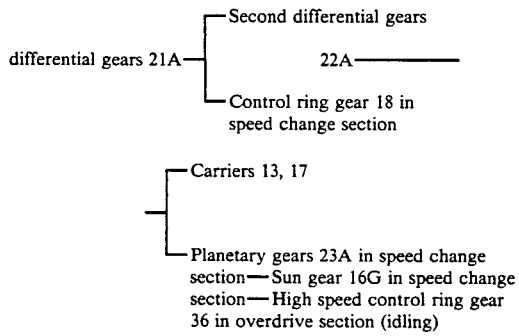

Figure 4:
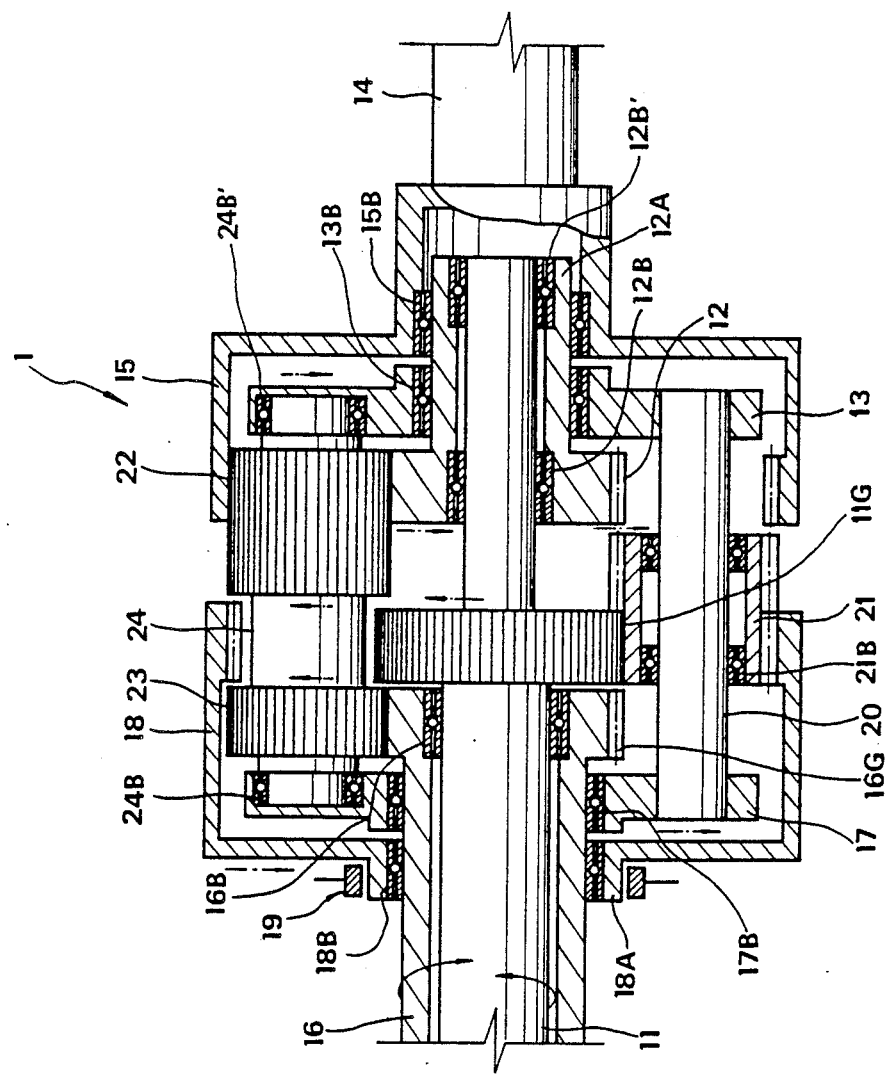
FIGS. 4 and 5 are a sectional and a perspective view respectively of the speed change section of the present invention which idles in the neutral state.
Figure 5:
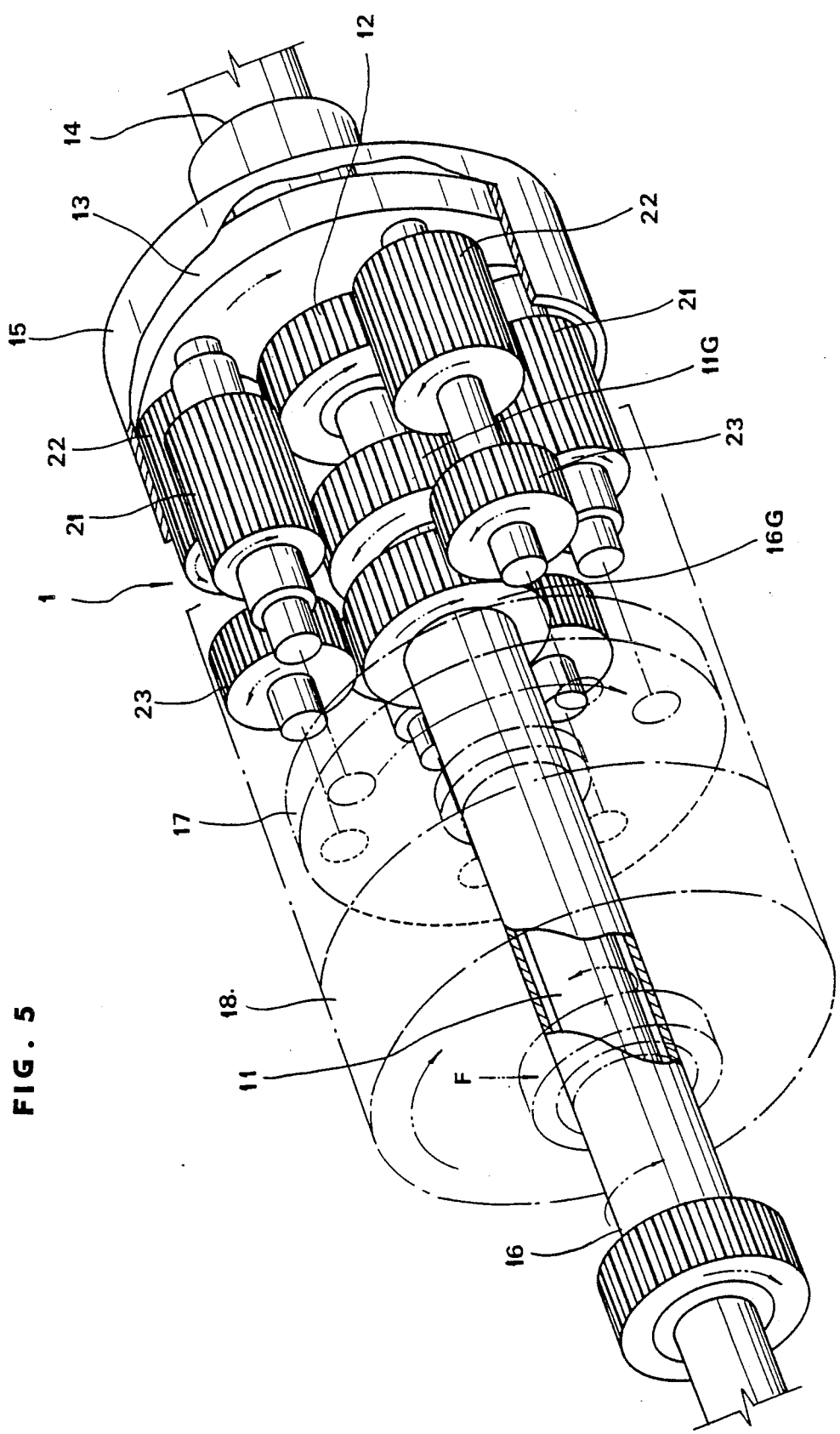

FIGS. 4 and 5 illustrate the neutral state of the transmission in which the driving power of the engine is not transmitted to the output shaft 14. When the rotational force is transmitted from the driving shaft of the engine to the input shaft 11, the input shaft rotates the input sun gear 11G in the same direction as the input shaft 11.

In the neutral state brake means 19 and 38 are not activated and the rotational driving force transmitted to the input shaft 11 results in the input rotational energy being rotationally dissipated within the transmission of the present invention by:

1. rotating the gear 11G in the same direction as the input shaft 11,
2. which in turn rotates each gear 21 of the plurality of the first differential gears 21A in a direction opposite to the input shaft 11,
3. the rotation of each gear 21 of the plurality of the first differential gears 21A in turn rotates the control ring gear 18 in a direction opposite to that of input shaft 11 and rotates each gear 22 of the plurality of the second differential gears 22A, in the same direction as that of the input shaft 11, which in turn rotate idler gear 12 in a direction opposite to that of the input shaft 11,
4. with each gear 22 of the plurality of the second differential gears 22A being in mechanical communication with the stationary output ring gear 15 results in the rotation of carriers 13, 17 (which receive rotational force via the plurality of rods 24A which interlinks carriers 13, 17) in a direction opposite to the rotation of input shaft and which in turn results in the rotation in a direction opposite to the rotation of the input shaft of:

the sun gear 16G, the common transmission shaft 16 and sun gear 16G', 5. the rotation of the sun gear 16G' results in the rotation of each gear 35 of the plurality of the second planetary gears 35A about sun gear 16G' and further results in the rotation of the circular plate carrier 37, which receives rotational force via a plurality of locking pins 33A which interlinks carriers 37 and 32, in the same direction as the input shaft 11,
6. the rotation of each gear 35 of the plurality of the second planetary gears 35A further results in the rotation of the high speed control ring gear 36 in the same direction as the input shaft 11, and
7. the carrier 32 rotates in the direction of the input shaft 11 and receives rotational force via a plurality of locking pins 33A, to result in the rotation of each gear of the plurality of the first planetary gears 31A, which are also in mechanical communication with the fixed ring gear 34, to rotate in a direction opposite that of the input shaft 11 which, in total, results in the rotational driving force not being transmitted to the output shaft 14, i.e. resulting in a neutral state. Upon rotation of the input sun gear 11G the each gear 21 of the plurality of first differential gears 21A rotate about the respective pin 20 in a direction opposite to that of the input sun gear 11G. Also, each gear 21 of the plurality of the first differential gears 21A rotate each gear 22 of the plurality of the second differential gears 22A in a direction opposite to that of gear 21. However, because the output ring gear 15 is stationary, i.e. is heavily loaded, each gear 22 of the plurality of the second differential gears 22A rotates in the opposite direction to that of each gear 21 of the plurality of the first differential gears 21A and at the same time the plurality of pins 20A and the plurality of rods 24A rotate about the input shaft 11 in the same direction as each gear 21 of the plurality of the first differential gears 21A is rotating relative to its axis.

Figure 6:
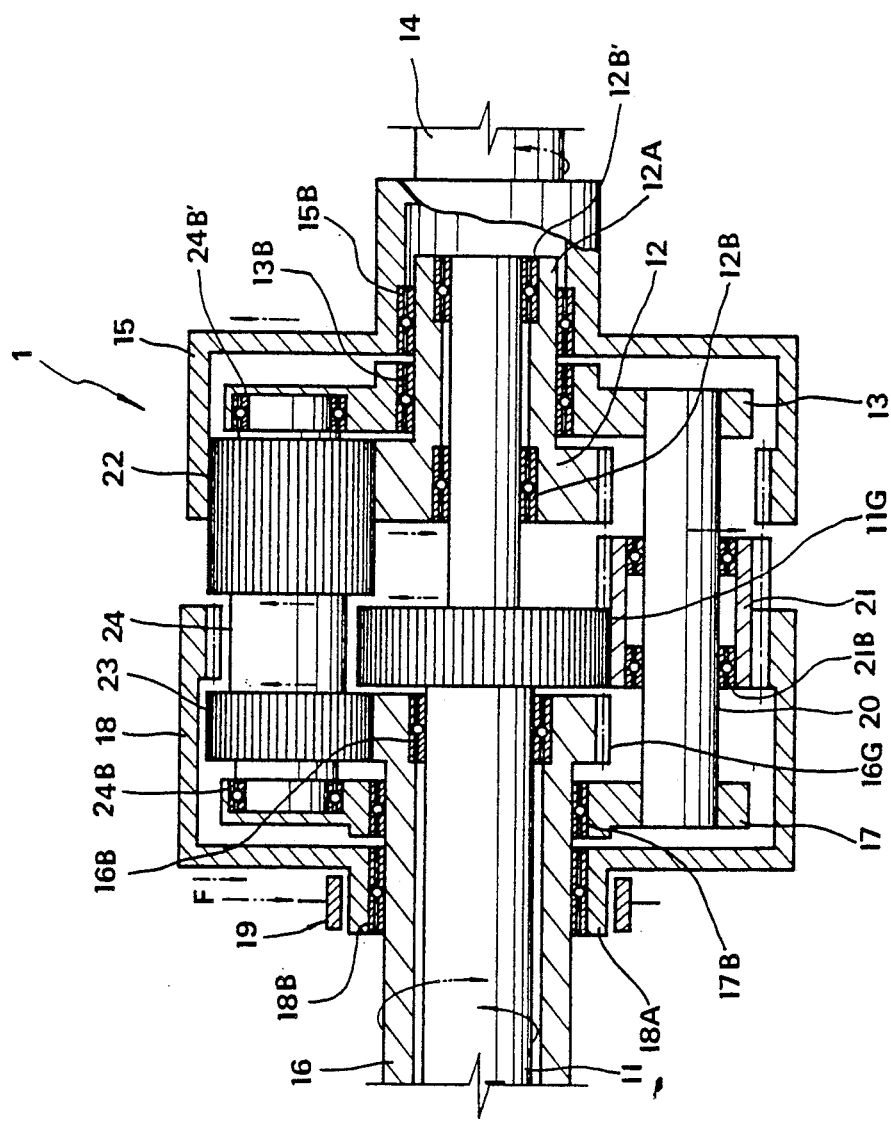
FIGS. 6 and 7 are a sectional and a perspective view respectively of the speed change section of the present invention in the low speed state.
Figure 7:
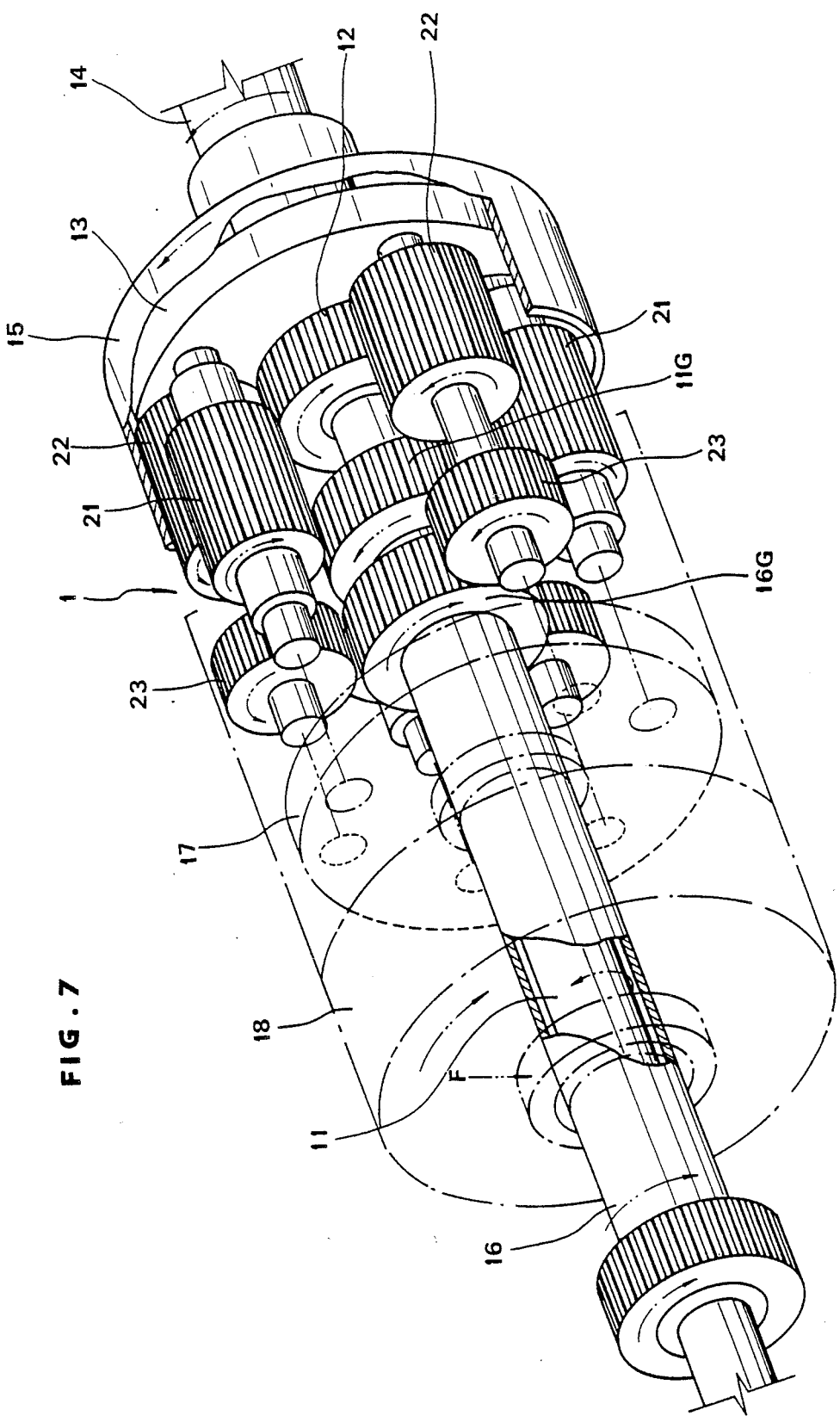

2. Low speed state (FIGS. 6 and 7)

Input shaft 11—Input sun gear 11G—First

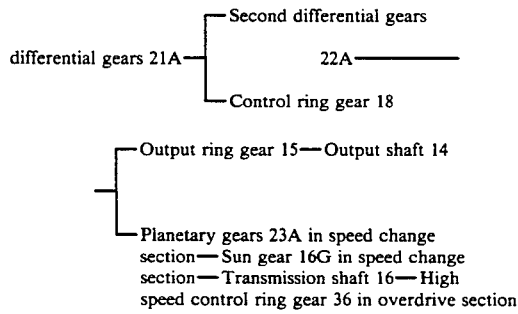

The low speed state is a state in which the automobile starts gradually from the stationary state.

The following occurs in attaining the low speed state:

The input shaft 11 rotates the input sun gear 11G, the first brake means 19 is activated to frictionally engage control ring 18 to slow down, but not stop, the rotational speed of control ring 18. Thus, the rotational speed of the carriers 13, 17, the plurality of first differential gears 2!A and the plurality of the second differential gears 22A slows. However, the torque being applied to the output ring gear 15, i.e. the output shaft 14, by means of the plurality of gears 22A increases causing the output ring gear 15 to begin to rotate.

In other words, if the magnitude of the frictional brake force F is such as to not stop the control ring gear 18, the rotational speed of the control ring gear 18 decreases as does the rotational speed of the plurality of gears 21A, 22A and 23A along with carriers 13, 17. As a result, the decrease in the rotational speed increases the torque of the plurality of gears 21A, 22A and 23A. The carriers 13, 17 Come to a stop, and at the same time the output ring gear 15 rotates in the same direction as the gears 22A, in turn, the output shaft 14 rotates in the same direction as the input shaft 11, as a result, the power is transmitted to the driving mechanism to initiate the movement of the automobile.

In other words, the frictional brake force F applied to the first brake means 19 decreases the rotational speed of the control ring gear 18 which increases the torque, i.e. rotating force, of the plurality of gears 22A, the carriers 13, 17 stop and the output ring gear 15 rotates, transmitting the rotational input to the output shaft 14.

Figure 8:
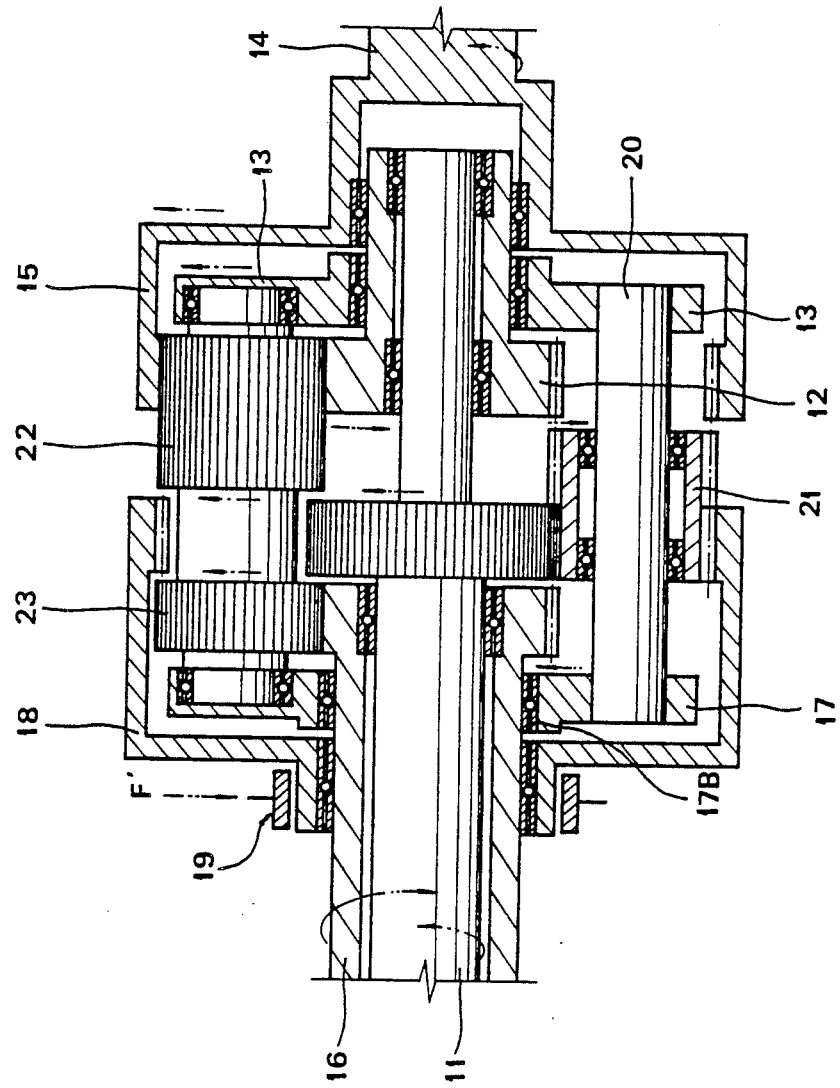
FIGS. 8 and 9 are a sectional and a perspective view of the speed change section of the present invention in the medium speed state.
Figure 9:
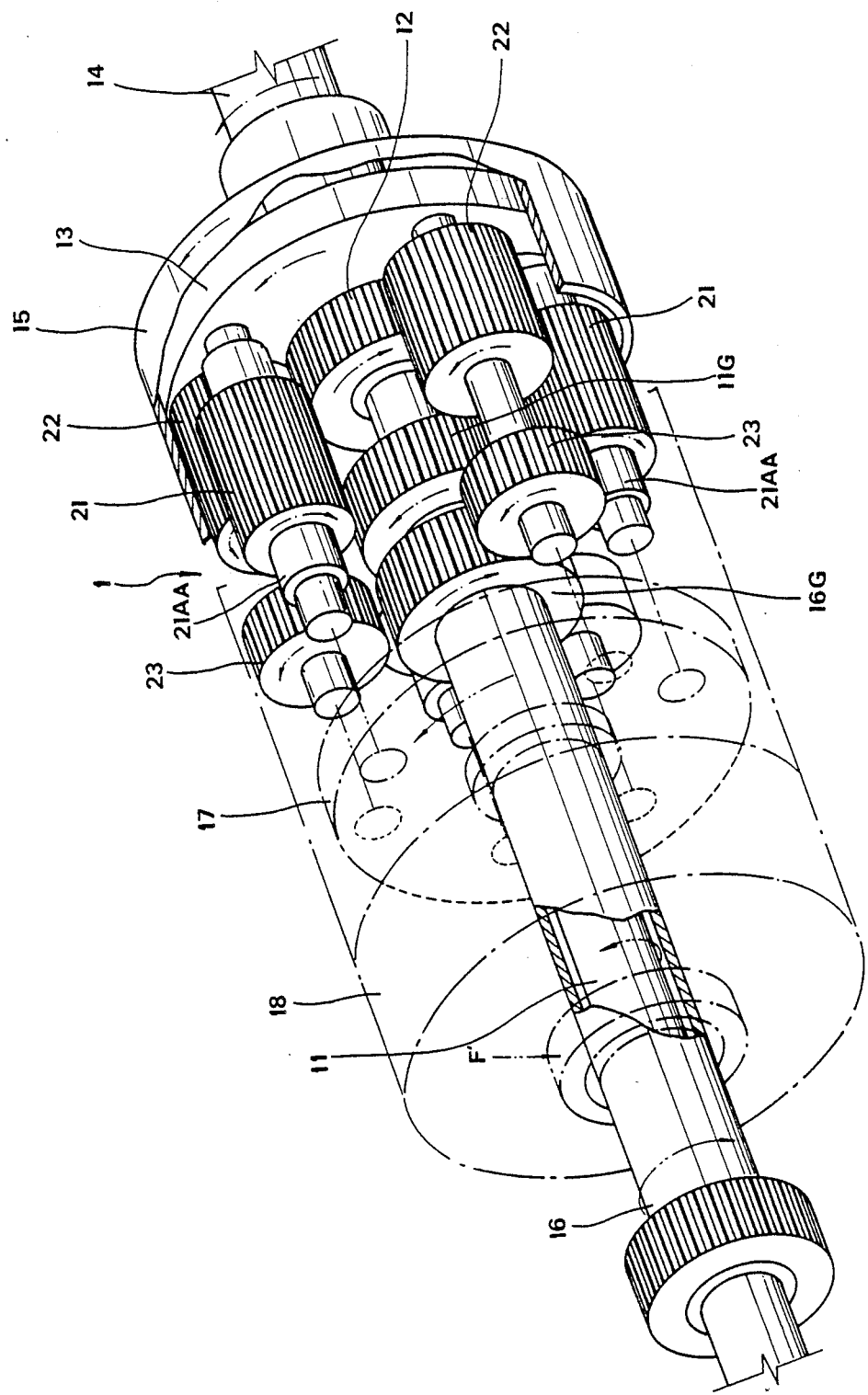

3. Medium speed state (FIGS. 8 and 9)

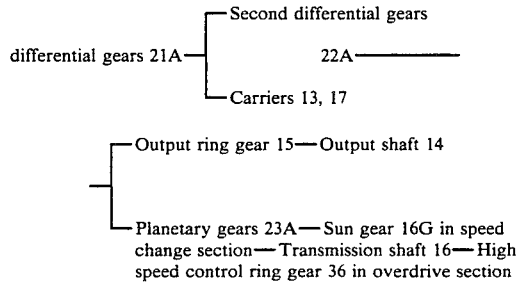

This state indicates the state in which the speed of the automobile is further increased from the previous low speed state. The control ring gear 18 is brought to a complete stop by the frictional brake force F' applied by the first brake means 19. Thus, the rotational speed of the plurality of first differential gears 21A decreases and the torque increases, as a result the carriers 13, 17 rotate in the same direction as the input sun gear 11G. Due to the rotation of the carriers, the rotational speed of the plurality of first differential gears 21A and the second differential gears 22A decreases, and at the same time the torque of gears 21A and 22A increases such that the output ring gear 15 rotates in the same direction as the input sun gear 11G.

That is, the carriers 13, 17 which were stationary in the low speed state now rotate, and the decrease in the rotational speed gears 21A and 22A causes an increase in the rotation of the output ring gear 15, i.e. the output shaft 14, which results in an increase of speed.

Figure 12:
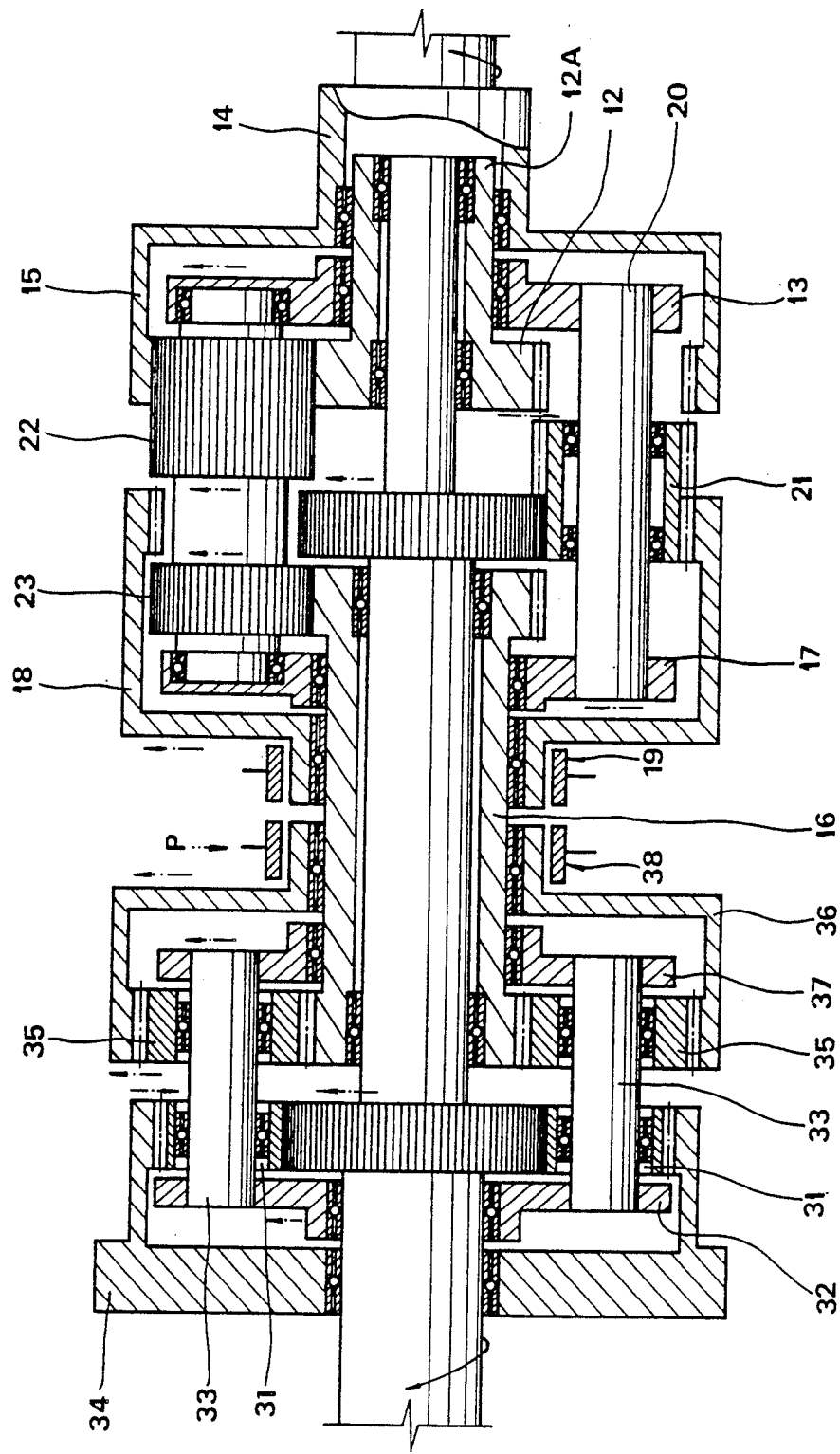
FIG. 12 is a sectional view of the transmission of the present invention in the medium-high speed state.

4. Medium-high speed state (FIG. 12)

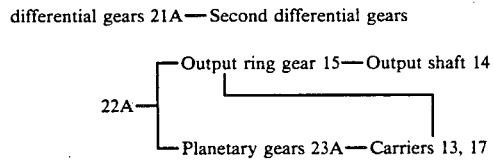

This state indicates the state in which the speed of the automobile is further increased from the previous medium speed state. The brake force F' applied to the control ring gear 18 is removed. Brake force P is applied to the high speed control ring gear 36 to slow, but not stop, the rotational speed of the high speed control ring gear 36 by the second brake means 38. This action stops the rotation of the transmission shaft 16, the sun gear 16G and the sun gear 16G'. The rotational speed of the planetary gears 23A further decreases, and in turn, the rotational speed of the carriers 13, 17 further increases, relative to the medium speed state. Hence, rotational speed of the output ring gear 15 and the output shaft 14 is further accelerated.

In this state, the direction of the rotation of the each gear of the plurality of first differential gears 21A is opposite to that of the input sun gear 11G, and the carriers 13, 17 and the control ring gear 18 in speed change section 18 rotate in the same direction as the input sun gear 11G, that is, the input shaft 11. Accordingly, the direction of the rotation of the output ring gear 15 and the output shaft 14 is same as that of the input shaft 11. The idler gear 12 is stationary in this state.

5. High speed state (FIG. 13)

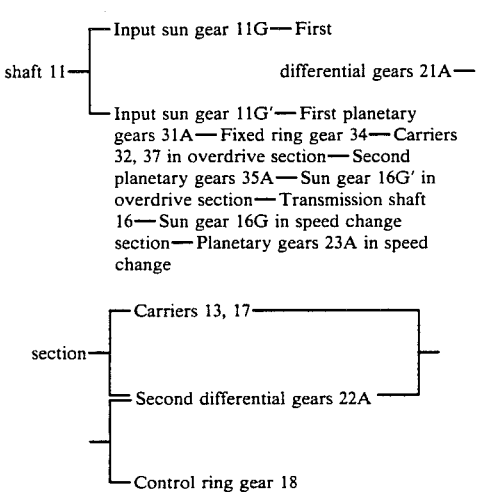

In this state the noise of the engine is reduced and the output revolutions are greater than the input revolutions.

The frictional brake force P' applied to the high speed control ring gear 36 by means of the second brake means 38, stops the high speed control ring gear 36. At this time, the rotational force of the input sun gear 11G' rotates the plurality of first planetary gears 31A which, in turn, rotate in a direction opposite to that of the sun gear 11G' making carriers 32, 37 rotate in the same direction as the sun gear 11G' since ring gear 34 cannot rotate. With the high speed control ring gear 36 stopped, the rotational speed of the plurality of second planetary gears 35A decreases and the rotational speed of the carriers 32, 37 increases. Accordingly, the sun gear 16G', which is in mechanical communication with the plurality of second planetary gears 35A, rotates in the same direction as the input shaft 11.

The input sun gear 11G rotates due the rotational input to the input shaft 11, and in turn, the each gear 21, 22, 23 of the speed change section 1 does not rotate about their respective axis however the carriers 13, 17 and the other components of the entire speed change section 1 constitute a single rotating body relative to the axis of the input shaft.

And when it is needed to increase the revolutions of the output shaft 14 further than that of the input shaft 11, the determined output revolutions can be obtained by adjusting the ratio of teeth of the input sun gear 11G' in overdrive section and the sun gear 16G' in overdrive section as much as the needed revolutions instead of adding additional parts.

The gears utilized in the present, the number of teeth per each gear may be varied in accordance with the desired purpose. One example is described hereafter, with the specific numbers of teeth (T), that is, input sun gear 11G : 33T, input sun gear 11G': 36T, idler gear 12 : 33T, output ring gear 15 : 81T, sun gear 16G 33T, sun gear 16G': 27T, control ring gear 18 : 81T, first differential gear 21 : 24T, second differential gear 22 : 24T, planetary gear 23 : 24T, first planetary gear 31 : 18T, fixed ring gear 34 : 72T, second planetary gear 35 : 27T, high speed control ring gear 36 : 81T.

In the case where the carriers 13, 17 stop rotating in the low speed state, per 1 turn of the input shaft 11, the output shaft 14 turns as follows:

$$\frac{\text{input sun gear } 11G}{\text{first differential gear } 21} \times \frac{\text{second differential gear } 22}{\text{output ring gear } 15} =$$

$$\frac{33T}{24T} \times \frac{24T}{81T} = \frac{11}{27} = 0.407 \text{ (turns)}$$

In the case where the control ring gear 18 is at a standstill in the medium speed state, per 1 turn of the input shaft 11, the output shaft 14 turns as follows:

a) According to the equation of the planetary gear rotation ratio, the control ring gear 18 at standstill, input through input sun gear 11G, and the carriers 13, 17 will result in the following output rotation.

$$\frac{\text{input sun gear } 11G}{\text{input sun gear } 11G + \text{control ring gear } 18} =$$

$$\frac{33T}{33T + 81T} = \frac{11}{38} \text{ (turns)}$$

b) Because the control ring gear 18 and output ring gear 15 are meshed with the first and second differential gears 21A, 22A respectively, by nature of the differential gear, the control ring gear 18 and output ring gear 15 make 1 turn each for every turn of the carriers 13, 17. But if the control ring gear 18 is held at a standstill, the output ring gear 15 will make 2 turns.

c) The number of turns of the output shaft 14 are calculated as:

$$(a) \times (b) = \frac{11}{38} \times 2 = \frac{11}{19} = 0.578 \text{ (turns)}$$

In the case where the transmission shaft 16 and the sun gear 16G are at a standstill in the medium—high speed state, per 1 turn of the input shaft the output shaft 14 turns as follows:

a) Input sun gear 11G one turn, with sun gear 16G at standstill, hence ½ turn of carriers 13, 17 due to the nature of the differential gear.

b) Sun gear 16G at standstill, the number of turns of the output shaft 14 for each turn of the carriers 13, 17 is:

$$\frac{\text{sun gear } 16G + \text{output ring gear } 15}{\text{output ring gear } 15} =$$

$$\frac{33T + 81T}{81T} = \frac{38}{27} \text{ (turns)}$$

c) Number of turns of the output ring gear 15 is:

$$(a) \times (b) = \frac{1}{2} \times \frac{38}{27} = \frac{19}{27} = 0.704 \text{ (turns)}$$

In case where the high speed control ring gear 36 is at a standstill in the overdrive section, per 1 turn of input sun gear 11G', the sun gear 16G' turns as follows:

a) As the ring gear 34 is fixed, when input sun gear 11G' makes one turn, according to the planetary gear equation, the number of turns of the carriers 32, 37 is:

$$\frac{\text{input sun gear } 11G'}{\text{input sun gear } 11G' + \text{fixed ring gear } 34} =$$

$$\frac{36T}{36T + 72T} = \frac{1}{3} \text{ (turns)}$$

b) When the high speed control ring gear 36 is at a standstill and carriers 32, 37 make ⅓ turns, according to the equation of the turns of the planetary gears, the number of turns of sun gear 16G' is:

$$\frac{\text{sun gear } 16G' + \text{high speed control ring gear } 36}{\text{sun gear } 16G'} \times$$

$$\frac{1}{3} = \frac{27T + 81T}{27T} \times \frac{1}{3} = \frac{4}{3} = 1.33 \text{ (turns)}$$

As described above, when the continuously variable transmission of the present inventions converts and transmits the engine power through the input shaft to the output shaft, it does not require any construction or any clutch device which cuts or connects the power, and it can adjust the variation ratio without engaging, disengaging, or changing gears so that the satisfactory speed adjustment is possible. Accordingly it can be satisfactorily used in many applications including those requiring a high starting torque, and because of its small size and simple construction, it can be economically produced and is able to be installed in a small space.

The continuously variable transmission of the present invention is not limited to the present embodiment. The present transmission can be used in devices, such as industrial machines, which need to convert and transmit the driving force to the output shaft.

Among the embodiments illustrated herein, such as the hydraulic lining brake means for applying the frictional brake force to the control ring gears, other brake means such as electronic, electric, hydraulic and pneumatic, etc., may be used, so that even though examples for such various constructions are not described in detail, the present invention shall not be interpreted as being limited to the drawings and the embodiment.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A variable speed transmission, comprising:

an input shaft 11 with a first section 11A, a midsection 11B and a second section 11C for receiving rotational input;

an input sun gear 11G mounted between said midsection 11B and said second section 11C of said input shaft to enable simultaneous rotation with said input shaft;

a differential gear carrier 13 rotatably mounted to enable independent rotation about said second section of said input shaft 11;

a transmission shaft 16 having a first end 16A and a second end 16C and being rotatably and coaxially mounted at said mid-section of said input shaft to enable independent rotation about said input shaft and with said first end of said transmission shaft 16 terminating in a sun gear 16G;

a differential gear carrier 17 mounted on said transmission shaft 16 to enable independent rotation about said transmission shaft 16;

a plurality of pins 20A with each pin 20 secured to and interlinking said differential gear carrier 13 and said differential gear carrier 17 to enable simultaneous rotation of said carriers 13 and 17 relative to said input shaft;

a plurality of first differential gears 21A with each said gear 21 being rotatably mounted on a pin 20, respectively, of said plurality of pins 20A and with each said gear 21 being in mechanical communication with said input sun gear 11G;

a control ring gear 18 rotatably mounted on said transmission shaft 16 with said control ring gear being in mechanical communication with each said gear 21 of said plurality of first differential gears 21A;

a plurality of rods 24A with each rod 24 interlinking and being rotatably secured to each said differential gear carrier 13 and said differential gear carrier 17 to enable each rod 24 to rotate about its axis and to enable simultaneous rotation of said carriers 13 and 17 relative to said input shaft;

an output shaft 14 terminating in an output ring gear 15 with said output shaft and said output ring gear 15 being mounted to enable independent rotation of said output ring gear and output shaft about said input shaft;

a plurality of second differential gears 22A with each said gear 22 rotatably mounted on a rod 24 of said plurality of rods 24A and with each said gear 22 being in simultaneous mechanical communication with a gear 21 of said plurality of first differential gears 21A and said output ring gear 15;

a plurality of planetary gears 23A with each said planetary gear 23 mounted on each said rod 24 of said plurality of rods 24A which includes a gear 22 of said plurality of second differential gears 22A and with each said planetary gear 23 of said plurality of planetary gears 23A being in mechanical communication with said sun gear 16G; and a first brake means 19 for applying rotational resistance to said control ring gear 18 such that in use when said first brake means 19 gradually frictionally engages said control ring gear 18, the rotation of said control ring gear 18 decreases whereby torque is applied to said output shaft 14 to rotationally initiate said output shaft 14 and upon further activation of said first brake means to stop the rotation of said control ring gear 18, the rotational speed of said output shaft 14 further increases.

2. The variable speed transmission of claims 1 further including:

an idler gear 12 including a hub 12A mounted on said second section of said input shaft to enable independent rotation relative to said input shaft;

said differential gear carrier 13 being mounted on said hub of said idler gear 12 to enable independent rotation relative to said hub of said idler gear 12; and said output shaft 14 which terminates in said output ring gear 15 being distally mounted on said hub relative to said differential gear carrier 13 to enable independent rotation of said output ring gear and output shaft relative to said hub.

3. The variable speed transmission of claim 1, wherein said brake means 19 utilizes mechanical frictional force to control the rotational speed of said control ring gear 18.

4. The variable speed transmission of claim 1, wherein said brake means 19 utilizes electromagnetic force to control the rotational speed of said control ring gear 18.

5. The variable speed transmission of claim 1 further comprising an overdrive section 3 wherein said second end 16C of said transmission shaft 16 terminates in a sun gear 16G';

a circular plate carrier 37 rotatably mounted on said second end 16C of said transmission shaft 16;

a circular plate carrier 32 rotatably mounted on said first section 11A of said input shaft 11;

a plurality of locking pins 33A with each said locking pin 33 secured to and interlinking said circular plate carrier 37 and said circular plate carrier 32 to enable simultaneous rotation of said carriers 32 and 37 relative to said input shaft;

a plurality of second planetary gears 35A with each said planetary gear 35 rotatably mounted on each said locking pin 33 of said plurality of locking pins 33A;

said sun gear 16G' being in mechanical communication with each said gear 35 of said plurality of second planetary gears 35A;

a high speed control ring gear 36 rotatably mounted on said transmission shaft 16 with said ring gear 36 being in mechanical communication with each said gear 35 of said plurality of second planetary gears 35A;

an input sun gear 11G' mounted between said first section 11A and said mid-section 11B of said input shaft to enable simultaneous rotation with said input shaft;

a plurality of first planetary gears 31A with each said gear 31 of said plurality of said first planetary gears 31A rotatably mounted on each said locking pin 33 of said plurality of locking pins 33A and with each said gear 31 of said plurality of first planetary gears 31A being in mechanical communication with said input sun gear 11G';

a ring gear 34 which is secured against rotation relative to said input shaft 11 with said ring gear 34 being in mechanical communication with each said gear 31 of said plurality of first planetary gears 31A; and a second brake means 38 for applying rotational resistance to said high speed control ring gear 36 such that in use when said frictional resistance being applied to said control ring gear 18 is removed and when said second brake means 38 frictionally engages said high speed control ring gear 36, the rotational speed of said high speed control ring gear 36 decreases resulting in an increase of the rotational speed of said output shaft 14 and upon further activation of said second brake means to stop the rotation of said high speed control ring 36, the rotational speed of said output shaft 14 exceeds the rotational input of input shaft.

6. The variable speed transmission of claim 5, wherein said brake means 38 utilizes mechanical frictional force to control the rotational speed of said high speed control ring gear 36.

7. The variable speed transmission of claim 5, wherein said brake means 38 utilizes electromagnetic force to control the rotational speed of said high speed control ring gear 36.

8. The variable speed transmission of claim 5, with each said input sun gear 11G' and said sun gear 16G' include a diameter wherein said diameter of said input sun gear 11G' is greater than said diameter of said sun gear 16G', and with each said gear 31 of said plurality of first planetary gears 31A and each said gear 35 of said plurality of second planetary gears 35A include a diameter wherein said diameter of each said gear 31 of said plurality of first planetary gears 31A is smaller than said diameter of each said gear 35 of said plurality of second planetary gears 35A.

9. A variable speed transmission, comprising:

an input shaft 11 with a first section 11A, a midsection 11B and a second section 11C for receiving rotational input;

an input sun gear 11G mounted between said midsection 11B and said second section 11C of said input shaft to enable simultaneous rotation with said input shaft;

an idler gear 12 including a hub 12A mounted on said second section of said input shaft to enable independent rotation relative to said input shaft;

a differential gear carrier 13 mounted on said hub of said idler gear 12 to enable independent rotation relative to said hub of said idler gear 12;

a transmission shaft 16 having a first end 16A and a second end 16C and being rotatably and coaxially mounted at said mid-section of said input shaft to enable independent rotation relative to said input shaft and with said first end of said transmission shaft 16 terminating in a sun gear 16G and said second end of said transmission shaft 16 terminating in a sun gear 16G';

a differential gear carrier 17 mounted on said transmission shaft 16 to enable independent rotation relative to said transmission shaft 16;

a plurality of pins 20A with each pin 20 secured to and interlinking said differential gear carrier 13 and said differential gear carrier 17 to enable simultaneous rotation of said carriers 13 and 17 relative to said input shaft;

a plurality of first differential gears 21A with each said gear 21 being rotatably mounted on a pin 20, respectively, of said plurality of pins 20A and with each said gear 21 being in mechanical communication with said input sun gear 11G;

a control ring gear 18 rotatably mounted on said transmission shaft 16 with said control ring gear being in mechanical communication with each said gear 21 of said plurality of first differential gears 21A;

a plurality of rods 24A with each rod 24 interlinking and being rotatably secured to each said differential gear carrier 13 and said differential gear carrier 17 to enable each rod 24 to rotate about its axis and to enable simultaneous rotation of said carriers 13 and 17 relative to said input shaft;

an output shaft 14 terminating in an output ring gear 15 with said output ring gear 15 being distally mounted on said hub relative to said differential gear carrier 13 to enable independent rotation of said output ring gear and output shaft relative to said hub;

a plurality of second differential gears 22A with each said gear 22 rotatably mounted on a rod 24 of said plurality of rods 24A and with each said gear 22 being in simultaneous mechanical communication with a gear 21 of said plurality of first differential gears 21A and said output ring gear 15;

a plurality of planetary gears 23A with each said planetary gear 23 mounted on each said rod 24 of said plurality of rods 24A which includes a gear 22 of said plurality of second differential gears 22A and with each said planetary gear 23 of said plurality of planetary gears 23A being in mechanical communication with said sun gear 16G;

a circular plate carrier 37 rotatably mounted on said second end 16C of said transmission shaft 16;

a circular plate carrier 32 rotatably mounted on said first section 11A of said input shaft 11;

a plurality of locking pins 33A with each said locking pin 33 secured to and interlinking said circular plate carrier 37 and said circular plate carrier 32 to enable simultaneous rotation of said carriers 32 and 37 relative to said input shaft;

a plurality of second planetary gears 35A with each said planetary gear 35 rotatably mounted on each said locking pin 33 of said plurality of locking pins 33A;

said sun gear 16G' being in mechanical communication with each said gear 35 of said plurality of second planetary gears 35A;

a high speed control ring gear 36 rotatably mounted on said transmission shaft 16 with said ring gear 36 being in mechanical communication with each said gear 35 of said plurality of second planetary gears 35A;

an input sun gear 11G' mounted between said first section 11A and said mid-section 11B of said input shaft to enable simultaneous rotation with said input shaft;

a plurality of first planetary gears 31A with each said gear 31 of said plurality of said first planetary gears 31A rotatably mounted on each said locking pin 33 of said plurality of locking pins 33A and with each said gear 31 of said plurality of first planetary gears 31A being in mechanical communication with said input sun gear 11G';

a ring gear 34 which is secured against rotation relative to said input shaft 11 with said ring gear 34 being in mechanical communication with each said gear 31 of said plurality of first planetary gears 31A;

a first brake means 19 for applying rotational resistance to said control ring gear 18 such that in use when said first brake means 19 frictionally engages said control ring gear 18, the rotation of said control ring gear 18 decreases whereby torque is applied to said output shaft 14 to rotationally initiate said output shaft 14 and upon further activation of said first brake means to stop the rotation of said control ring gear 18, the rotational speed of said output shaft 14 further increases; and a second brake means 38 for applying rotational resistance to said high speed control ring gear 36 such that in use when said frictional resistance being applied to said control ring gear 18 is removed and when said second brake means 38 frictionally engages said high speed control ring gear 36, the rotational speed of said high speed control ring gear 36 decreases resulting in an increase in the rotational speed of said output shaft 14 and upon further activation of said second brake means to stop the rotation of said high speed control ring gear 36, the rotational speed of said output shaft 14 exceeds the rotational input of input shaft.

10. The variable speed transmission of claim 9, wherein said brake means 19 utilizes mechanical frictional force to control the rotational speed of said control ring gear 18.

11. The variable speed transmission of claim 9, wherein said brake means 38 utilizes mechanical frictional force to control the rotational speed of said high speed control ring gear 36.

12. The variable speed transmission of claim 9, wherein said brake means 38 utilize electromagnetic force to control the rotational speed of said high speed control ring gear 36.

13. The variable speed transmission of claim 9, wherein said brake means 19 utilizes electromagnetic force to control the rotational speed of said control ring gear 18.

14. The variable speed transmission of claim 9, wherein said brake means 19, 38 utilize mechanical frictional force to control the rotational speed of said control ring gear 18 and said high speed control ring gear 36, respectively.

15. The variable speed transmission of claim 9, wherein said brake means 19, 38 utilize electromagnetic force to control the rotational speed of said control ring gear 18 and said high speed control ring gear 36, respectively.

16. The variable speed transmission of claim 9, with each said input sun gear 11G' and said sun gear 16G' include a diameter wherein said diameter of said input sun gear 11G' is greater than said diameter of said sun gear 16G', and with each said gear 31 of said plurality of first planetary gears 31A and each said gear 35 of said plurality of second planetary gears 35A include a diameter wherein said diameter of each said gear 31 of said plurality of first planetary gears 31A is smaller than said diameter of each said gear 35 of said plurality of second planetary gears 35A.

* * * * *